Figure 1:
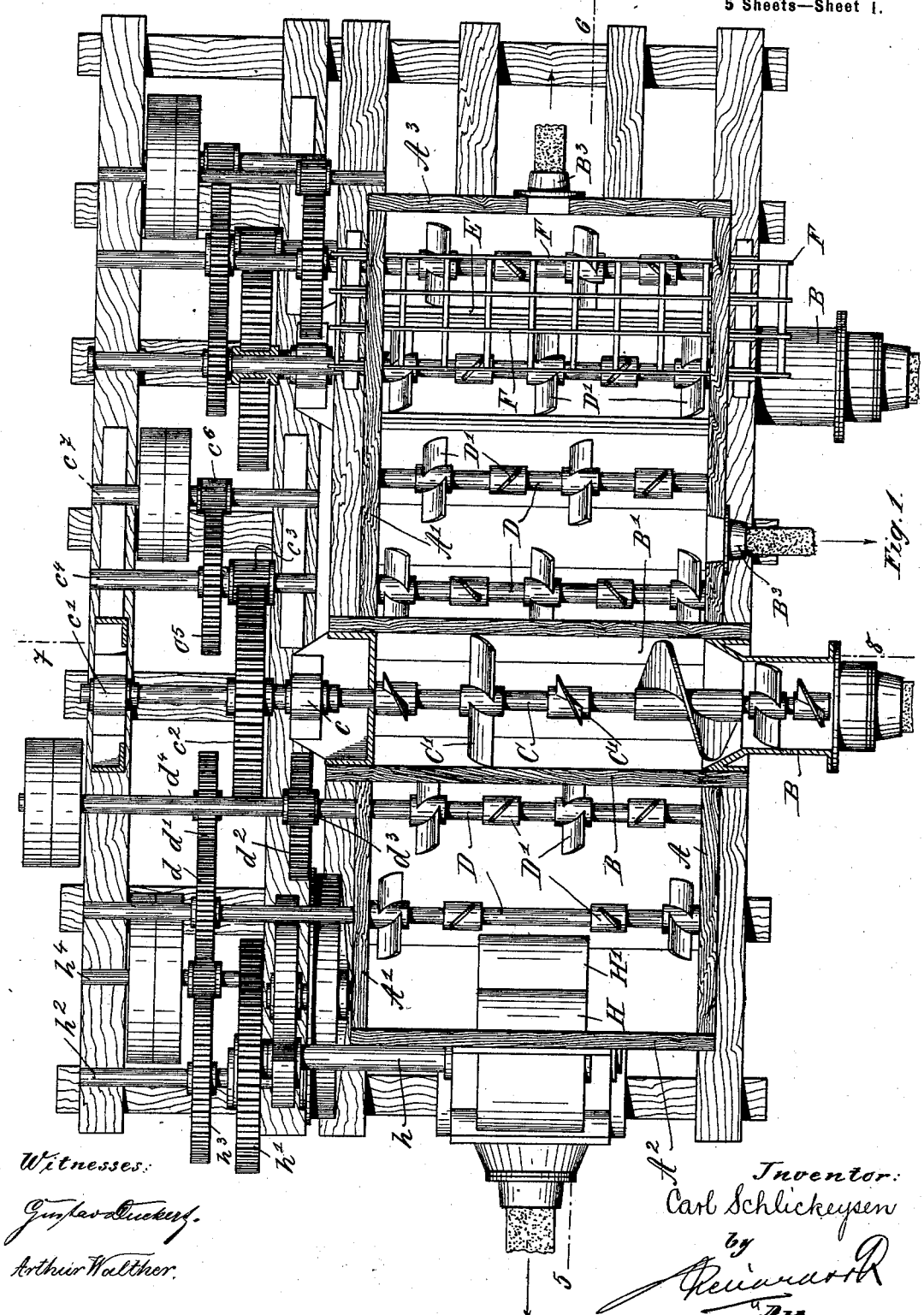

No. 663,103. Patented Dec. 4, 1900.
C. SCHLICKEYSEN.
COMBINED SUMP, MIXING MILL, AND BRICK PRESS.
(Application filed Apr. 7, 1898.)

(No Model.) 5 Sheets—Sheet 1.

No. 663,103. Patented Dec. 4, 1900.
C. SCHLICKEYSEN.
COMBINED SUMP, MIXING MILL, AND BRICK PRESS.
(Application filed Apr. 7, 1898.)
(No Model.) 5 Sheets—Sheet 2.

Witnesses.
Gustav Duckert.
Arthur Walther.

Inventor:
Carl Schlickeysen
by
Reward R
Attorney.

No. 663,103. Patented Dec. 4, 1900.
C. SCHLICKEYSEN.
COMBINED SUMP, MIXING MILL, AND BRICK PRESS.
(Application filed Apr. 7, 1898.)

(No Model.) 5 Sheets—Sheet 4.

Witnesses:
Gustav Duckert
Arthur Walther

Inventor:
Carl Schlickeysen
by
Reinauer
Attorney.

No. 663,103. Patented Dec. 4, 1900.
C. SCHLICKEYSEN.
COMBINED SUMP, MIXING MILL, AND BRICK PRESS.
(Application filed Apr. 7, 1898.)

(No Model.) 5 Sheets—Sheet 5.

WITNESSES:

INVENTOR

ATTORNEYS

UNITED STATES PATENT OFFICE.

CARL SCHLICKEYSEN, OF BERLIN, GERMANY.

COMBINED SUMP, MIXING-MILL, AND BRICK-PRESS.

SPECIFICATION forming part of Letters Patent No. 663,103, dated December 4, 1900.

Application filed April 7, 1898. Serial No. 676,810. (No model.)

*To all whom it may concern:*

Be it known that I, CARL SCHLICKEYSEN, manufacturer, a subject of the King of Prussia, German Emperor, residing at Berlin, in the Kingdom of Prussia, German Empire, have invented a new and Improved Combined Sump, Mixing-Mill, and Brick-Press, of which the following is a specification.

In the manufacture of bricks in large quantities one has finally arrived at first cutting the brick material of the clay-stock and immediately thereafter putting it into the machine, then letting it pass (as a substitute for treating it in a sump) through a preparatory mixing-mill for the purpose of being uniformly drained (which may be done either after or prior to treating the clay in the preparatory mixing-mill) and through one or more rolling-mills, as necessary, and finally letting it enter the brick-press proper. There are thus in the practical execution of this method a number of distinct machines arranged one after the other and passed one after the other by the clay or by the brick material, respectively. The brick material is delivered from one machine immediately into the other and remains thus in constant motion during the whole time of its passing through the whole set of machines. Owing to this manner of working the whole set of the machines in question contains always only a comparatively small quantity of material, which passes from the first machine to the last in a comparatively short time or with a comparatively great speed. In consequence of this any irregularity in the supply of the clay to the first machine is noticed only when the bricks are cut off the continuous bar of clay pressed out of the brick-making machine.

The purpose of my invention is to do away with this drawback, and I attain that object by certain arrangements and combinations of parts, as are described hereinafter.

In order to make my invention more clear, I refer to the accompanying drawings, in which similar letters denote similar parts throughout the several views, and in which—

Figure 2:
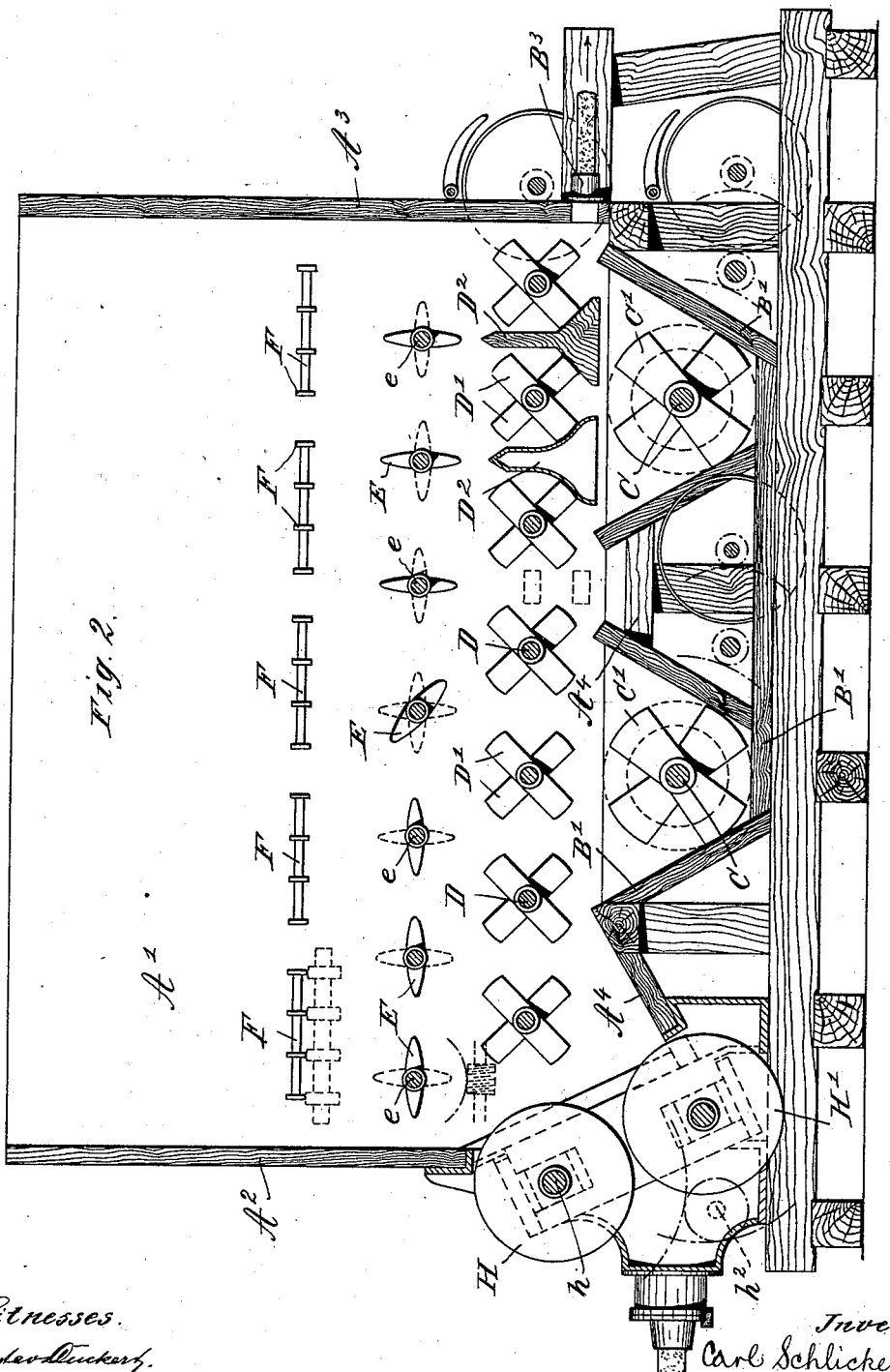
Figure 3:
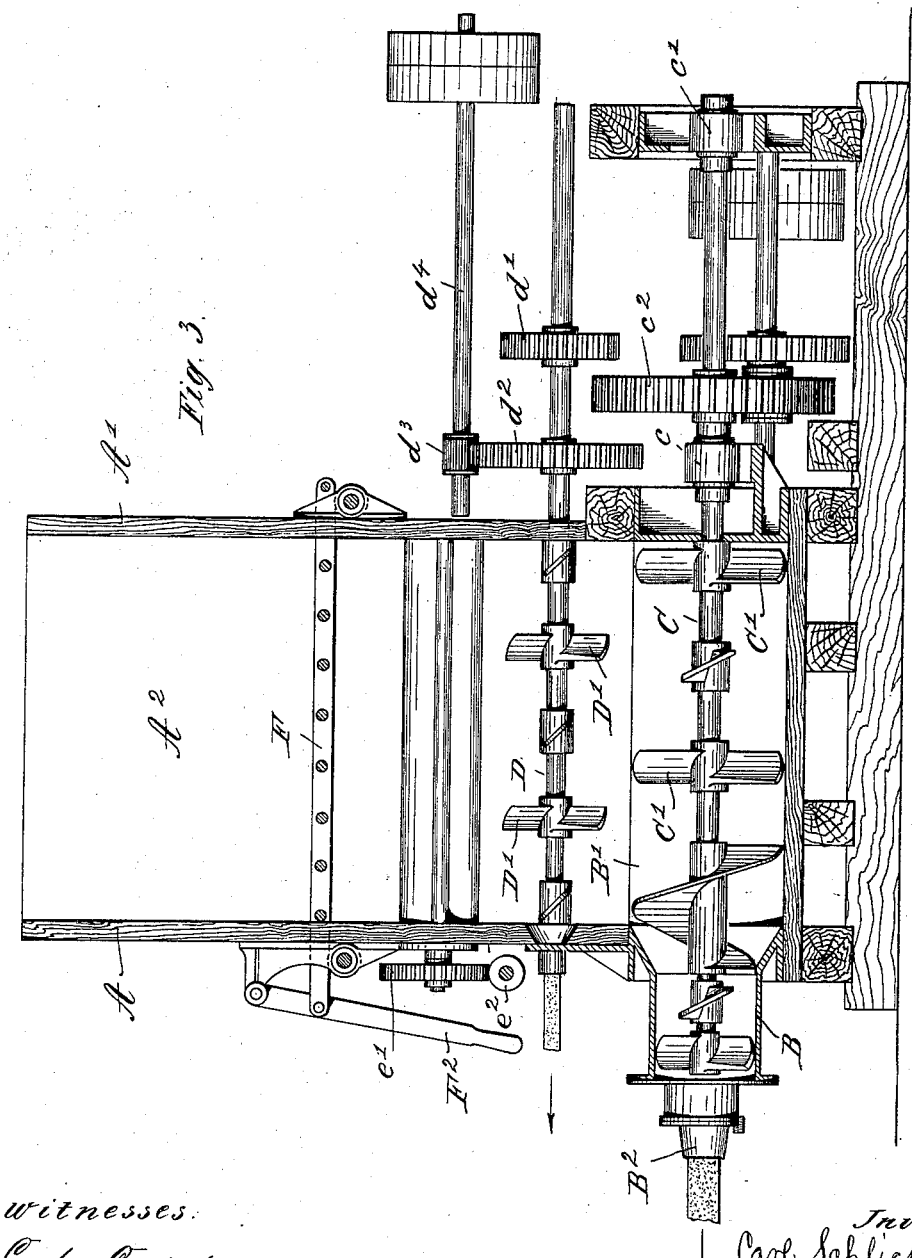
Figure 4:
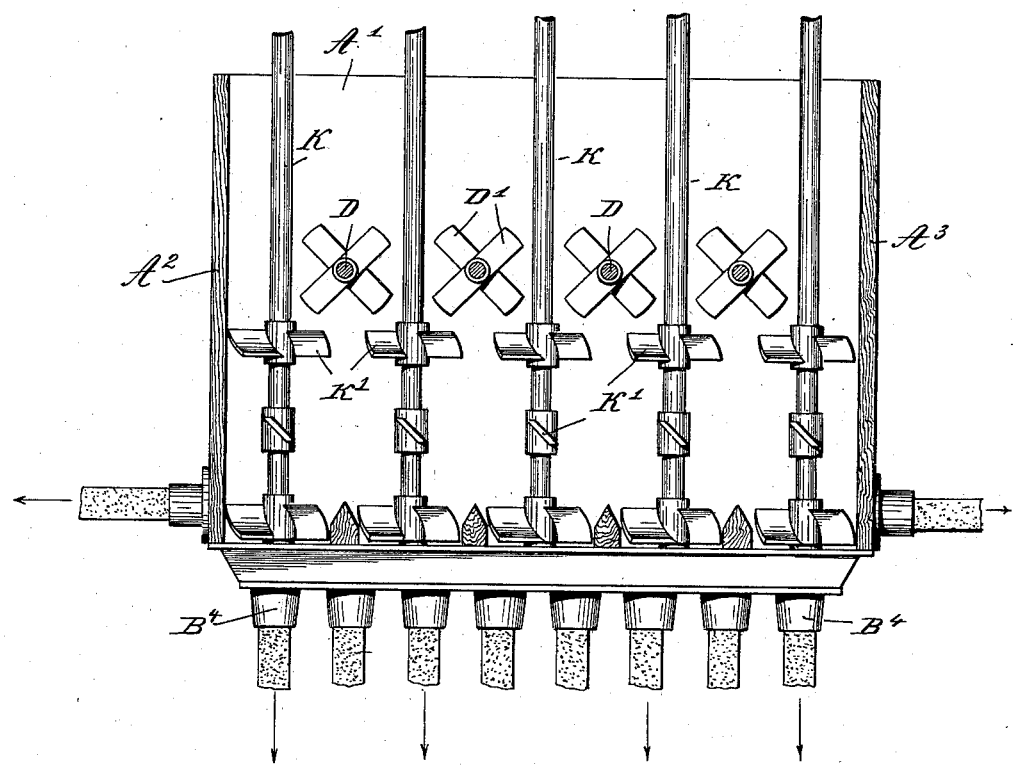
Figure 5:
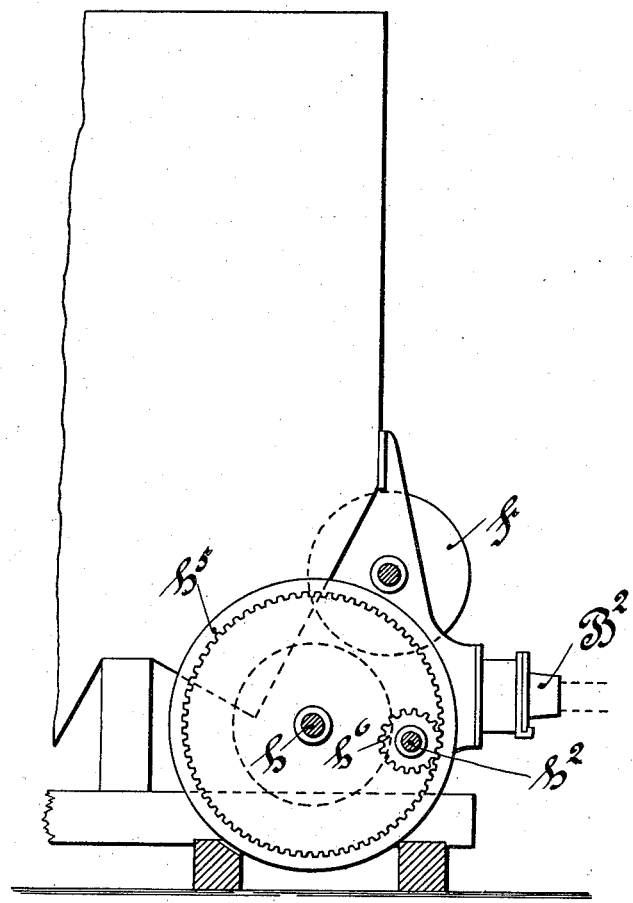

Figure 1 is a plan of my new and improved combined sump, preparatory mixing-mill, and brick-press, some of the upper parts being broken away in order to more distinctly show the lower ones. Fig. 2 is a vertical longitudinal section through that machine, the section being taken in lines 5 6 of Fig. 1. Fig. 3 is a vertical cross-section through the machine, taken in lines 7 8 of Fig. 1. Fig. 4 is a vertical section through a modified form of construction, which will duly be referred to hereinafter. Fig. 5 is a side view of the rear part of the machine.

My improved combined sump, preparatory mixing-mill, and brick-press is constructed as follows:

A structure of beams of any suitable construction supports vertical walls A A' A² A³, constituting a so-called "clay-sump." The bottom of the sump is formed partly by horizontal and inclined planks A⁴ and partly by horizontal and inclined planks B'. The planks B' form walls of horizontal brick-presses, which are closed at their rear ends and are provided at their front ends with circular casings B, Figs. 2 and 3, projecting forth from the wall A. Each of these brick-presses or of the casings B, respectively, is provided with a mouthpiece B², from which proceeds the bar of clay to be cut into bricks. The spaces formed or inclosed by the planks or walls B' are in direct communication with the main space formed or inclosed by the walls A A' A² A³; but this communication may be partly closed by a kind of horizontal ledges or walls D², Fig. 2, which are arranged about parallel to the planks B' above these latter and are supported at their ends by the walls A A'. These ledges or walls D² may be either solid or hollow, as shown in Fig. 2, and they are preferably broadened at their lower edge, as also represented in said figure. The purpose of the ledges or walls D² is to prevent the shafts C and the wings C' of said shafts from being too strongly subjected to the pressure of the clay lying above them. Each of the solid or hollow ledges D² is located between two horizontal shafts D, each of which is furnished with pairs of wings D', these pairs being arranged one rectangularly to the other, as is also the case with the pairs of wings C' of the shafts C. The shafts D, with their shafts D', constitute the preparatory mixing-mill, and these wings tend constantly to move the clay downward as well as laterally; but owing to the broadened ledges D² being arranged between the shafts D the clay is prevented from pressing too strongly upon the shafts C and the wings C' of the same.

The shafts C, the wings C', the walls B', the casings B, and the mouthpieces $B^2$ constitute the brick-presses aforementioned. The shafts C are supported by bearings $c\ c'$, Figs. 1 and 3, located outside the sump and supported themselves by castings of suitable configuration. In the form of construction shown the machine has two brick-presses of the kind just described, and as the means for rotating the shafts C are similar for both these presses I think it sufficient to describe these means only with regard to one (the left-hand) press. The shaft C is provided with a large cog-wheel $c^2$, Figs. 2 and 3, which gears with a pinion $c^3$, Fig. 1, fixed to a shaft $c^4$. This shaft has a cog-wheel $c^5$ gearing with a pinion $c^6$, secured to a shaft $c^7$. This shaft has a loose pulley and a fast one for connecting it to the shafting of the respective factory. All these shafts or the bearings for the same, respectively, are also supported by the structure of beams aforementioned. The shafts D, with their wings D', are operated in a similar manner. Concerning, for instance, the first and second of these shafts, reckoned from the left to the right, the arrangement is as follows: The first shaft has a cog-wheel $d$, Fig. 1, meshing with another cog-wheel $d'$ of the same size. This cog-wheel is attached to the second shaft D, which further carries a cog-wheel $d^2$, Figs. 1 and 3, of somewhat larger size. The cog-wheel $d^2$ meshes with a pinion $d^3$, secured to the shaft $d^4$. The latter has an ordinary pulley for connecting it to the shafting of the factory or to the source of power, respectively.

The toothed wheelwork for operating the various shafts of the machine may be varied in a wide degree, and it is obvious that this may be done without departing from my invention, as it is of no influence whatever upon the effect of the machine which form of construction for the gearing is chosen.

Above the shafts D are located movable or rotary steel ledges E, which may receive different positions, as shown in Fig. 2. These ledges are secured to shafts $e$, each of which carries at its projected front end a worm-wheel $e'$, Fig. 3. Each of these wheels gears with a worm $e^2$, and I prefer to secure the several worms all to one and the same shaft, (preferably provided with a hand-crank,) so that all the ledges E may be turned at a time. The object of these ledges is to prevent the shafts D, with their wings D', from being too strongly acted upon by the pressure of the clay. The passage of the clay from above to below is least hindered when the ledges E assume a vertical position, as in the case with the three ledges located on the right side of Fig. 2. In this case the clay presses with its full power upon the lower parts of the machine, and in consequence thereof the clay acted on by the wings D' is prevented from escaping in an upward direction, but can move only downward and laterally, the downward movement resulting in the clay moving into the reach of the wings C' and the lateral resulting in the clay moving forth from the mouthpieces $B^3$, Figs. 1 and 2. If the force with which the clay presses upon the shafts D and the wings D' is too great, the ledges E are inclined more or less, and in some cases they may even receive a horizontal position, as is the case with the three ledges located on the left side of Fig. 2, it being understood that the gearing for driving one ledge is arranged and timed similarly to those driving the other ledges.

The uppermost parts of the machine are formed by grates F, Figs. 2 and 3, which are arranged parallel to the ledges E or to the shafts D and C, respectively. These grates are movable, or, in other words, they may be moved to and fro in their longitudinal direction, each of them being supported by rolls secured to the outer surface of the walls A and A'. Each of the grates is connected with a hand-lever $F^2$, by means of which it may be actuated in the manner just stated. The number of these grates and the construction of the same—i. e., the number of the longitudinal parts—and of the cross parts constituting a grate may vary and depends on the condition of the material to be worked in the machine. The object of the grates is to retain larger impurities and to prevent disturbances in the proper work of the machine as may result from an obstruction caused by an irregular movement of the clay or by an entire interruption of the movement. In the form of construction shown the machine is provided with a roller-mill located in this case at the lower end of the wall $A^2$, Figs. 1 and 2. The mill has two rollers H H', the former of which is fixed to the shaft $h$. This shaft has a large cog-wheel $h'$, Fig. 1, which is operated by a pinion located below and secured to the shaft $h^2$. The latter has, further, a cog-wheel $h^3$, which is rotated from the cog-wheel $d$ aforementioned by means of a pinion fixed to the shaft $h^4$. This shaft has the pulleys for driving this part of the machine. The shaft of the roller H' has a large cog-wheel $h^5$, Fig. 5, with interior toothing, into which takes a pinion $h^6$, also fixed to the shaft $h^2$.

The mouthpieces need not indispensably be arranged at the sides of the machine, but they may also be located at the bottom of the same. In such a case I prefer to employ besides the horizontal shafts with their wings or knives (mixing-knives or kneading-knives) also vertical shafts with such wings or knives, which press the clay in a direction to the mouthpieces at the bottom of the sump. Such a form of construction is represented in Fig. 4, in which K represents the vertical shafts aforementioned. K' represents the knives of these shafts, and $B^4$ represents the mouthpieces into which the clay is pressed by said knives. In the form of construction shown there are horizontal shafts as well as vertical ones; but in some cases I may dispense with the horizontal shafts and make use only of the vertical ones. The mouthpieces need not always be such that deliver a bar of clay for the production of bricks, but they may produce other bodies—for instance, pipes or tubes.

My improved machine as aforedescribed need not in any case be employed for the working of clay, but other material—for instance, turf or peat, mortar, beton, ores, and other substances—may also be treated.

Having now described my invention, what I desire to secure by Letters Patent of the United States is—

In combination, the inclined planks B', mouthpiece B², the shafts C having the wings C' and adapted to force the material out through the mouthpieces B², the series of shafts D above and parallel with the shafts C and having wings thereon, the ledges D² extending up between the shafts D, the series of rotary ledges E above the shafts D with means for operating them and the grates F above the ledges E with operating means therefor, substantially as described.

In witness whereof I have hereunto set my hand in presence of two witnesses.

CARL SCHLICKEYSEN.

Witnesses:
  C. H. DAY,
  HENRY HASPER.